(12) United States Patent
Tan

(10) Patent No.: US 10,322,537 B2
(45) Date of Patent: *Jun. 18, 2019

(54) VALVE PIN POSITION ADJUSTER

(71) Applicant: Synventive Molding Solutions, Inc., Peabody, MA (US)

(72) Inventor: Zhuang Rui Tan, Evanston, IL (US)

(73) Assignee: Synventive Molding Solutions, Inc., Peabody, MA (US)

( * ) Notice: Subject to any disclaimer, the term of this patent is extended or adjusted under 35 U.S.C. 154(b) by 155 days.

This patent is subject to a terminal disclaimer.

(21) Appl. No.: 15/666,646

(22) Filed: Aug. 2, 2017

(65) Prior Publication Data

US 2017/0326766 A1   Nov. 16, 2017

Related U.S. Application Data

(63) Continuation of application No. 14/950,004, filed on Nov. 24, 2015, now Pat. No. 9,944,006, which is a (Continued)

(51) Int. Cl.
*B29C 45/28* (2006.01)
*B29C 45/27* (2006.01)
(Continued)

(52) U.S. Cl.
CPC ...... *B29C 45/2806* (2013.01); *B29C 45/2737* (2013.01); *B29C 45/281* (2013.01);
(Continued)

(58) Field of Classification Search
CPC .............. B29C 45/2806; B29C 45/281; B29C 45/2848
See application file for complete search history.

(56) References Cited

U.S. PATENT DOCUMENTS 7,997,895 B1   8/2011   Schmidt
2003/0224086 A1   12/2003   Olaru

FOREIGN PATENT DOCUMENTS

DE   4300334 A1   7/1993
DE   102010032340 A1   2/2012
WO   2014194037 A1   4/2012

OTHER PUBLICATIONS

Int'l. Search Report and Written Opinion in Int'l. Appln. No. PCT/US2014/039932.

*Primary Examiner* — James Sanders
(74) *Attorney, Agent, or Firm* — Polsinelli, PC

(57) ABSTRACT

An injection molding apparatus and method for adjusting the axial position of a valve pin in an injection molding system, the apparatus comprising:
   a top clamp plate, a heated manifold receiving and distributing an injection fluid to an exit of a fluid delivery channel to a cavity of the mold,
   an actuator comprising a housing having a chamber enclosing a drive member for driving a valve pin along an axial path of travel,
   the actuator housing slidably mounted and adapted for controlled upstream and downstream movement of the drive member along a path complementary to the axial path of travel of the valve pin,
   a mounting plate and an axial position adjustment screw screwably mounted within the mounting plate upstream of the housing of the actuator for controllably moving the valve pin to selectable starting or ending injection cycle axial positions.

31 Claims, 7 Drawing Sheets

Related U.S. Application Data continuation of application No. PCT/US2014/039932, filed on May 29, 2014.

(60) Provisional application No. 61/828,391, filed on May 29, 2013.

(51) Int. Cl.
 *B29C 45/72* (2006.01)
 *B29C 45/73* (2006.01)

(52) U.S. Cl.
 CPC .......... *B29C 45/72* (2013.01); *B29C 45/7331* (2013.01); *B29C 2045/2733* (2013.01); *B29C 2045/2848* (2013.01); *B29C 2045/7271* (2013.01)

VALVE PIN POSITION ADJUSTER

RELATED APPLICATIONS

This application is a continuation of and claims the benefit of priority to U.S. application Ser. No. 14/950,004 filed Nov. 24, 2015 which is a continuation of PCT/US2014/039932 filed May 29, 2014 which claims the benefit of priority of U.S. Provisional Application Ser. No. 61/828,391 filed May 29, 2013.

The disclosures of all of the following are incorporated by reference in their entirety as if fully set forth herein: U.S. Pat. Nos. 5,894,025, 6,062,840, 6,294,122, 6,309,208, 6,287,107, 6,343,921, 6,343,922, 6,254,377, 6,261,075, 6,361,300, 6,419,870, 6,464,909, 6,599,116, 7,234,929, 7,419,625, 7,569,169, U.S. patent application Ser. No. 10/214,118, filed Aug. 8, 2002, U.S. Pat. Nos. 7,029,268, 7,270,537, 7,597,828, U.S. patent application Ser. No. 09/699,856 filed Oct. 30, 2000, U.S. patent application Ser. No. 10/269,927 filed Oct. 11, 2002, U.S. application Ser. No. 09/503,832 filed Feb. 15, 2000, U.S. application Ser. No. 09/656,846 filed Sep. 7, 2000, U.S. application Ser. No. 10/006,504 filed Dec. 3, 2001, and U.S. application Ser. No. 10/101,278 filed Mar. 19, 2002 and U.S. application Ser. No. 13/484,336 filed May 31, 2012 and U.S. application Ser. No. 13/484,408 filed May 31, 2012.

BACKGROUND OF THE INVENTION

Injection molding systems powered by hydraulically driven actuators typically utilize the hydraulic system to adjust the initial positioning of the valve pin by driving the piston of the actuator, the housing or cylinder of which is fixedly attached to the hotrunner manifold such that the housing is stationary in the axial direction relative to the manifold. Other systems have been developed using a screw that forms a portion of the actuator housing.

SUMMARY OF THE INVENTION

An apparatus for adjusting the axial position of a valve pin in an injection molding system, the apparatus comprising:
an actuator comprising a housing having a chamber enclosing a drive member that is fixedly interconnectable to the valve pin, the drive member driving the valve pin reciprocally upstream and downstream along an axial path of travel through a fluid delivery channel having an exit to a cavity of a mold which is reciprocally opened and closed by reciprocal downstream and upstream driven movement of a tip end of the valve pin into and out of the exit of the fluid delivery channel,
the actuator housing being slidably mounted upstream of the fluid delivery channel for controlled upstream and downstream movement of the drive member along a path complementary to the axial path of travel of the valve pin,
a mounting plate and an axial position adjustment screw screwably mounted within the mounting plate upstream of the housing of the actuator,
the adjustment screw being controllably screwable clockwise and counterclockwise within the mounting plate to move along an upstream and downstream path complementary to the axial path of travel of the drive member and the valve pin,
the valve pin being movable to selectable starting or ending injection cycle axial positions upon interconnection of the valve pin to the drive member, clockwise or counterclockwise screwing of the adjustment screw within the mounting plate to corresponding selectable axial positions and subsequent interconnection of the adjustment screw to the actuator.

The drive member is preferably interconnectable to and disconnectable from the valve pin externally of the enclosure of the housing of the actuator while the enclosure is enclosed.

The apparatus typically further comprises a coupling that interconnects an upstream end of the valve pin to the axial drive device, the coupling being accessible for interconnection and disconnection of the valve pin while the enclosure is enclosed.

The actuator typically comprises a fluid driven actuator, the enclosure of the actuator comprising a fluid sealed chamber, the axial drive device comprising a piston slidably mounted within the fluid sealed chamber.

The mounting plate is typically fixedly mounted to either a fluid delivery manifold or a top clamping plate in an arrangement such that the adjustment screw is rotatable to axially adjust the valve pin to selectable upstream and downstream axial positions.

The manifold is preferably disposed between the mounting plate and the exit of the fluid delivery channel, the manifold having a fluid distribution channel delivering injection fluid to the fluid delivery channel.

The top clamp plate is typically disposed upstream of the manifold.

The actuator housing is preferably mounted for axial movement without rotation.

The apparatus can further comprise a top clamp plate interconnected to a mold containing a cavity with which the exit of the fluid delivery channel communicates, a heated manifold that delivers heated injection fluid to the fluid delivery channel and an injection molding machine that delivers heated injection fluid to the heated manifold.

In another aspect of the invention there is provided a method of adjusting an axial position of a valve pin in an injection molding system comprising an actuator comprised of a housing that forms an enclosure that contains a controllably drivable axial drive device interconnectable to and adapted to drive a valve pin reciprocally upstream and downstream along an axial path of travel through a fluid delivery channel having an exit which is reciprocally opened and closed by reciprocal upstream and downstream driven movement of a distal tip end of the valve pin into and out of the exit of the fluid delivery channel,
wherein the actuator is mounted upstream of the fluid delivery channel and adapted for controlled upstream and downstream movement of the actuator and the drive member along a path complementary to the axial path of travel of the valve pin,
the apparatus including a mounting plate and an axial position adjustment screw screwably mounted within the mounting plate upstream of the housing of the actuator, the adjustment screw being controllably screwable clockwise and counterclockwise within the mounting plate to move along an upstream and downstream path complementary to the axial path of travel of the drive member and the valve pin,
the method comprising:
screwing the adjustment screw clockwise or counterclockwise a selected degree of rotation within the mounting plate to position the adjustment screw at a selected axial position along its axial path of movement,
moving the actuator along the axial direction complementary to the axial path of travel of the valve pin, Such a method can further comprise fixedly interconnecting the adjustment screw to the actuator housing to controllably move the actuator and the valve pin to a preselected axial starting or ending injection cycle position along the axial path of movement of the valve pin as predetermined by the selected degree of screwable rotation of the adjustment screw.

Such a method preferably further comprises interconnecting and disconnecting the valve pin to and from the axial drive device externally of the actuator housing while the enclosure is enclosed and contains the axial drive device.

Such a method preferably further comprises moving the actuator housing along its axial path of movement without rotation.

The apparatus used in such a method preferably has the mounting plate fixedly mounted to either a fluid delivery manifold or a top clamping plate in an arrangement such that the adjustment screw is rotatable to adjust the valve pin to move to selectable upstream and downstream axial positions.

The apparatus used in such a method preferably has the manifold mounted between the actuator and the exit of the fluid delivery channel, the manifold having a fluid distribution channel delivering injection fluid to the fluid delivery channel.

The apparatus used in such a method preferably has the top clamp plate disposed upstream of the manifold.

In another aspect of the invention there is provided an apparatus for adjusting the axial position of a valve pin in an injection molding system, the apparatus comprising:

an actuator comprised of a housing that forms a chamber that contains a drive member interconnected to and adapted to drive a valve pin reciprocally upstream and downstream along an axial path of travel through a fluid delivery channel having an exit which is reciprocally opened and closed by reciprocal upstream and downstream driven movement of a distal tip end of the valve pin into and out of the exit of the fluid delivery channel, a mounting plate and an adjustment screw screwably mounted within the mounting plate, the mounting plate and adjustment screw being arranged such that the adjustment screw is controllably movable along an axial path complementary to the axial path of travel of the valve pin by controlled clockwise and counterclockwise screwable movement of the adjustment screw within the mounting plate, the actuator housing being slidably mounted upstream of the fluid delivery channel for controlled upstream and downstream movement of the drive member along a path complementary to the axial path of travel of the valve pin, a mounting plate and an axial position adjustment screw screwably mounted within the mounting plate, the adjustment screw being controllably screwable clockwise and counterclockwise within the mounting plate to move along an upstream and downstream path complementary to the axial path of travel of the drive member and the valve pin, the valve pin being movable to selectable starting or ending injection cycle axial positions upon interconnection of the valve pin to the drive member, clockwise or counterclockwise screwing of the adjustment screw within the mounting plate to corresponding selectable axial positions and subsequent interconnection of the adjustment screw to the actuator, the drive member being interconnectable to and disconnectable from the valve pin externally of the chamber of the housing of the actuator while the chamber is enclosed and contains the drive member.

Such an apparatus preferably further comprises a coupling that interconnects an upstream end of the valve pin to the axial drive device, the coupling being accessible for interconnection to and disconnection from the valve pin while the chamber is enclosed and contains the drive member.

The mounting plate and adjustment screw are preferably mounted separate and spaced upstream apart from the actuator housing.

The actuator can include a fluid driven actuator, the enclosure of the actuator comprising a fluid sealed chamber, the axial drive device comprising a piston slidably mounted within the fluid sealed chamber.

The mounting plate is preferably fixedly mounted to either a fluid delivery manifold or a top clamping plate in an arrangement such that the adjustment screw is rotatable to axially adjust the valve pin to selectable upstream and downstream axial positions.

The manifold is preferably disposed between the mounting plate and the exit of the fluid delivery channel, the manifold having a fluid distribution channel delivering injection fluid to the fluid delivery channel.

The top clamp plate is preferably disposed upstream of the manifold.

The actuator housing is preferably mounted for axial movement without rotation.

Such an apparatus typically further comprises a top clamp plate interconnected to a mold having a cavity with which the exit of the fluid delivery channel communicates, a heated manifold that delivers heated injection fluid to the fluid delivery channel and an injection molding machine that delivers heated injection fluid to the heated manifold.

In another aspect of the invention there is provided an apparatus for adjusting the axial position of a valve pin in an injection molding system, the apparatus comprising:

an actuator comprised of a housing that forms and encloses a chamber that contains a controllably drivable axial drive device interconnected to and adapted to drive a valve pin reciprocally upstream and downstream along an axial path of travel through a fluid delivery channel having an exit which is reciprocally opened and closed by reciprocal upstream and downstream driven movement of a distal tip end of the valve pin into and out of the exit of the fluid delivery channel, a mounting plate and adjustment screw mounted upstream, spaced apart and separate from the actuator housing, the mounting plate being mounted in an axially stationary position relative to the exit of the fluid delivery channel, the adjustment screw being screwably mounted within the mounting plate such that the adjustment screw is controllably movable along a path complementary to the axial path of travel of the valve pin by controlled clockwise and counterclockwise screwable movement of the adjustment screw within the mounting plate, the actuator housing being mounted for upstream and downstream axial movement of the axial drive device along a path complementary to the axial path of travel of the valve pin, the adjustment screw being readily fixedly interconnectable to and detachable from the actuator housing such that the axial drive device and valve pin are controllably movable together upstream and downstream to selectable axial positions when the adjustment screw and actuator housing are fixedly interconnected to each other, the distal tip end of the valve pin being controllably positionable at selectable axial positions relative to the exit by controlled clockwise and counterclockwise screwing of the adjustment screw within the mounting plate when the adjustment screw is fixedly interconnected to the actuator housing.

The axial drive device is preferably interconnectable to and disconnectable from the valve pin externally of the chamber while the chamber is enclosed and contains the axial drive device.

The apparatus can further comprise a coupling that interconnects an upstream end of the valve pin to the axial drive device, the coupling being accessible for interconnection and disconnection of the valve pin while the enclosure is enclosed.

The actuator typically comprises a fluid driven actuator, the chamber of the actuator comprising a fluid sealed chamber, the axial drive device comprising a piston slidably mounted within the fluid sealed chamber.

The mounting plate is preferably fixedly mounted to either a fluid delivery manifold or a top clamping plate in an arrangement such that the adjustment screw is rotatable to axially adjust the valve pin to selectable upstream and downstream axial positions.

The manifold is typically disposed between the mounting plate and the exit of the fluid delivery channel, the manifold having a fluid distribution channel delivering injection fluid to the fluid delivery channel.

The top clamp plate is preferably disposed upstream of the manifold.

The actuator is typically mounted for axial movement without rotation.

The apparatus preferably further comprises a top clamp plate interconnected to a mold containing a cavity with which the exit of the fluid delivery channel communicates, a heated manifold that delivers heated injection fluid to the fluid delivery channel and an injection molding machine that delivers heated injection fluid to the heated manifold.

BRIEF DESCRIPTION OF THE DRAWINGS

The above and further advantages of the invention may be better understood by referring to the following description in conjunction with the accompanying drawings in which.

DETAILED DESCRIPTION

Figure 1:
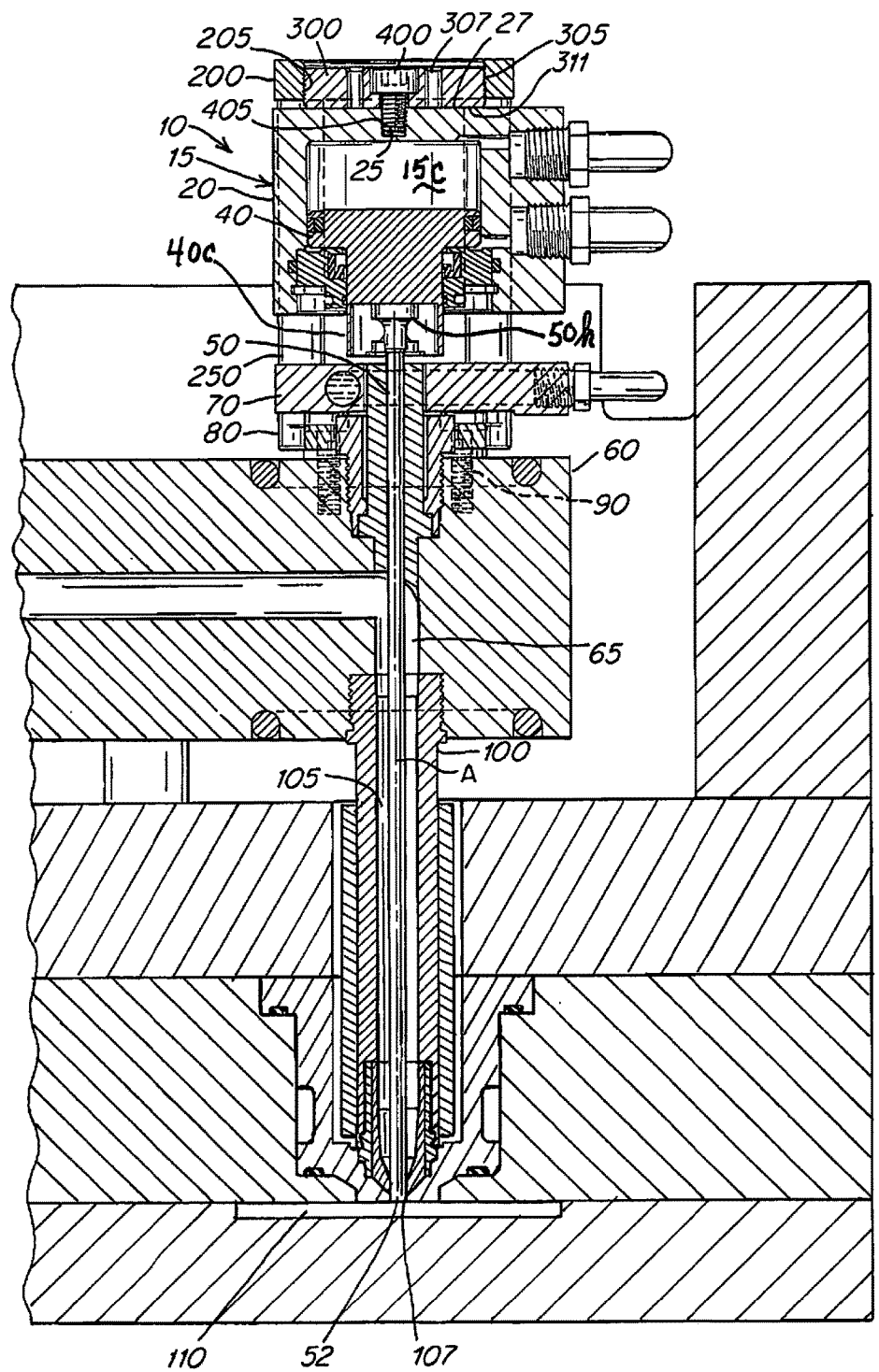
FIG. 1 is a cross section of a valve that includes an adjustment apparatus according to the invention showing the adjustment screw fixedly mounted to a cooling plate that is fixedly mounted to a fluid distribution manifold.
Figure 2:
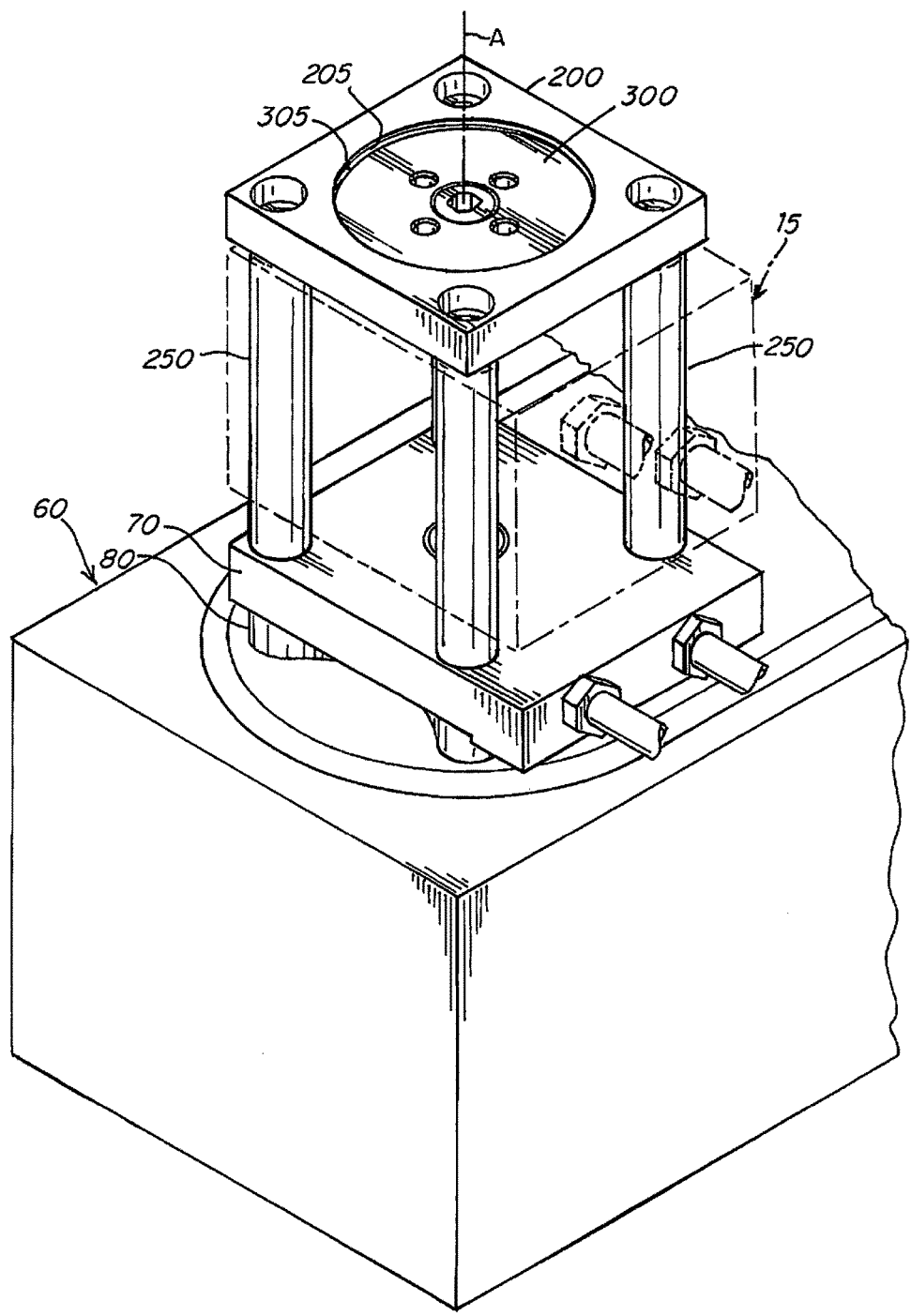
FIG. 2 is a perspective view of mounting plate and adjustment screw according to the invention shown fixedly mounted to a cooling plate via mounting screws having mounting rails, the mounting screws fixedly mounting the adjustment screw to a fluid distribution manifold.
Figure 3:
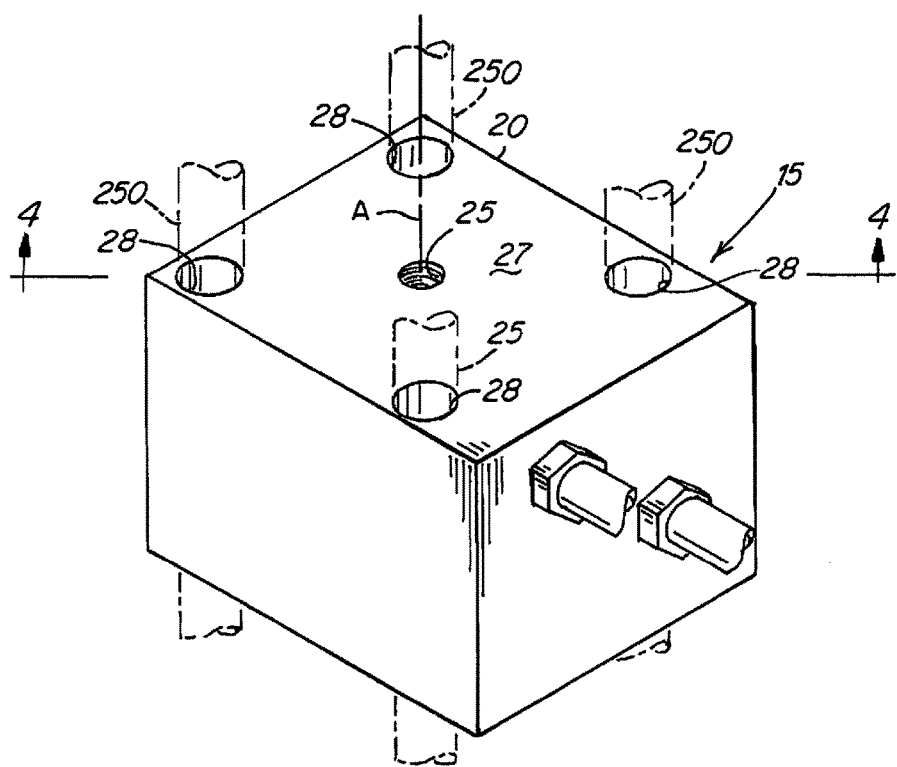
FIG. 3 is a perspective view of an actuator housing that can be slidably mounted on the rails shown in FIG. 2 showing axial apertures provided in the housing that slidably receive the rails.

As shown in FIGS. 1-7, the invention provides an apparatus 10 for adjusting the axial position A of a valve pin 50 in a larger injection molding system that typically includes an injection molding machine 2 that injects molten injection fluid 4 into the distribution channels 65 et al. of a heated distribution manifold or hotrunner 60. The apparatus 10 includes an actuator 15 comprising a housing 20 having a chamber 15c enclosing a piston drive member 40 that is fixedly interconnectable to the valve pin 50, the drive member 40 driving the valve pin 50 reciprocally upstream and downstream along an axial path of travel A through a fluid delivery channel 63 having an exit or gate 107 to a cavity 110 of a mold 112 which is reciprocally opened and closed by reciprocal downstream and upstream driven movement AA, FIG. 4, of a distal downstream tip end 52 of the valve pin 50 into and out of the exit 107 of the fluid delivery channel 63. The actuator housing 20 is slidably mounted upstream of the fluid delivery channel 63 for controlled upstream and downstream movement AA of the drive member 40 along a path complementary to the axial path of travel A of the valve pin.

The apparatus 10 includes a mounting plate 200 and an axial position adjustment screw 300 screwably mounted within the mounting plate 200 upstream of the housing 20 of the actuator 15, the adjustment screw 300 being controllably screwable clockwise 315 and counterclockwise 317 within the mounting plate 200 to move along an upstream and downstream path A complementary to the axial path of travel A of the drive member 40 and the valve pin 50.

The path of movement or travel of the screw 300 and drive member 40 and actuator 20 can be generally parallel to path of travel A of the valve pin 50. Or the path of movement or travel of the adjustment screw 300 and drive member 40 can be axially aligned or coincident with the path of axial travel A of the valve pin 50

The valve pin 50 is movable to selectable axial starting or ending injection cycle positions along the path of travel A such that the axial position of the tip end 52 of the valve pin 50 is selectively adjustable by selectable rotation 315, 317 of the adjustment screw 300. The selected starting or ending axial position of the valve pin 50 is effected by first clockwise or counterclockwise screwing of the adjustment screw 300 is fixed or set, fixedly interconnecting the actuator 15 or housing 20 to the adjustment screw 300 via locking bolt 400. Once the axial position of the screw 300 is set, the starting or ending injection cycle position of the valve pin 50 is correspondingly set via the interconnection of the screw 300 to the housing and the mounting of the drive member 40 within the housing 20 and the interconnection of the actuator coupling 40c to the proximal upstream disposed pin head 50h.

The drive member 40 is preferably interconnectable to and disconnectable from the valve pin 50, 50h externally of the enclosure or chamber 15c of the housing 20 of the actuator 15 while the enclosure 15c is still enclosed not requiring disassembly of the actuator 15 or housing 20 in order to gain access to the mechanism(s) that interconnect the pin 50 to the drive member 40.

The actuator can alternatively comprise an electrically powered motor as described for example in U.S. Pat. No. 6,294,122 that has an electrically or electric power driven rotor that is mounted and housed in an actuator chamber or housing, the rotor being driven to move along an axial path of travel to concomitantly drive a valve pin 50 along an axial path of travel in a fluid delivery channel as described in U.S. Pat. No. 6,294,122, the disclosure of which is incorporated herein by reference in its entirety.

The apparatus typically further comprises a coupling 40c that interconnects an upstream end 50h of the valve pin 50 to the axial drive device 40, the coupling 40c being accessible for interconnection and disconnection of the valve pin head 50h with and while the enclosure or chamber 15c containing the drive member 40 is still enclosed.

The actuator 15 typically comprises a fluid driven actuator, the enclosure 15c of the actuator 15 comprising a fluid sealed chamber 15c, the axial drive device comprising a piston 40 slidably mounted within the fluid sealed chamber 15c.

The mounting plate 200 is typically fixedly mounted to either a fluid delivery manifold or hotrunner 60, FIGS. 1-5, or to a top clamping plate 800, FIG. 6, in an arrangement such that the adjustment screw 300 is rotatable 315, 317 to axially adjust A the valve pin 50 to selectable upstream and downstream axial positions.

The manifold 60 is preferably disposed between the mounting plate 200 and the exit 107 of the fluid delivery channel 63, 65, the manifold 60 having a fluid distribution channel 65 delivering injection fluid to the fluid delivery channel 63.

The top clamp plate 800 is typically disposed upstream of the manifold.

The actuator housing 20 is preferably slidably mounted on rails 250 for axial movement A without rotation, the rails preventing the housing 20 from rotating when the screw 300 is screwably rotated 315, 317.

The top clamp plate 800 is typically fixedly interconnected to a mold or mold plate(s) 112 containing a cavity 110 with which the exit 107 of the fluid delivery channel communicates. The heated manifold 60 delivers heated injection fluid 4 to the fluid delivery channel 63 and the injection molding machine 2 that delivers heated injection fluid 4 to the heated manifold 60.

As shown in FIG. 1, the apparatus 10 is comprised of an actuator 15 that is comprised of a housing 20, a piston 40 acting as the drive mechanism which is sealably and slidably mounted within a complementary cylindrical chamber 15c formed within the housing 20. The downstream end of the piston 40 is axially fixedly connected to the upstream proximal end 50h of the valve pin 50 that has a downstream distal tip end 52 that is reciprocally drivable upstream and downstream along the axis A into and out of a complementarily configured exit port or gate 107 of a downstream portion 105 of the channel formed by a nozzle 62. The exit port 107 is the downstream terminus of the downstream channel portion 105 formed within the distal end 100 of the nozzle 62 that is axially stationarily mounted to and assembled together with a fluid distribution manifold 60 that has a distribution channel 65 that communicates with and delivers injection fluid under pressure to and downstream through channels 63, 105 and eventually through the exit port 107 when the pin 50 and tip end 52 are disposed upstream, the injection fluid flowing out of exit port 107 into mold cavity 110.

Figure 4:
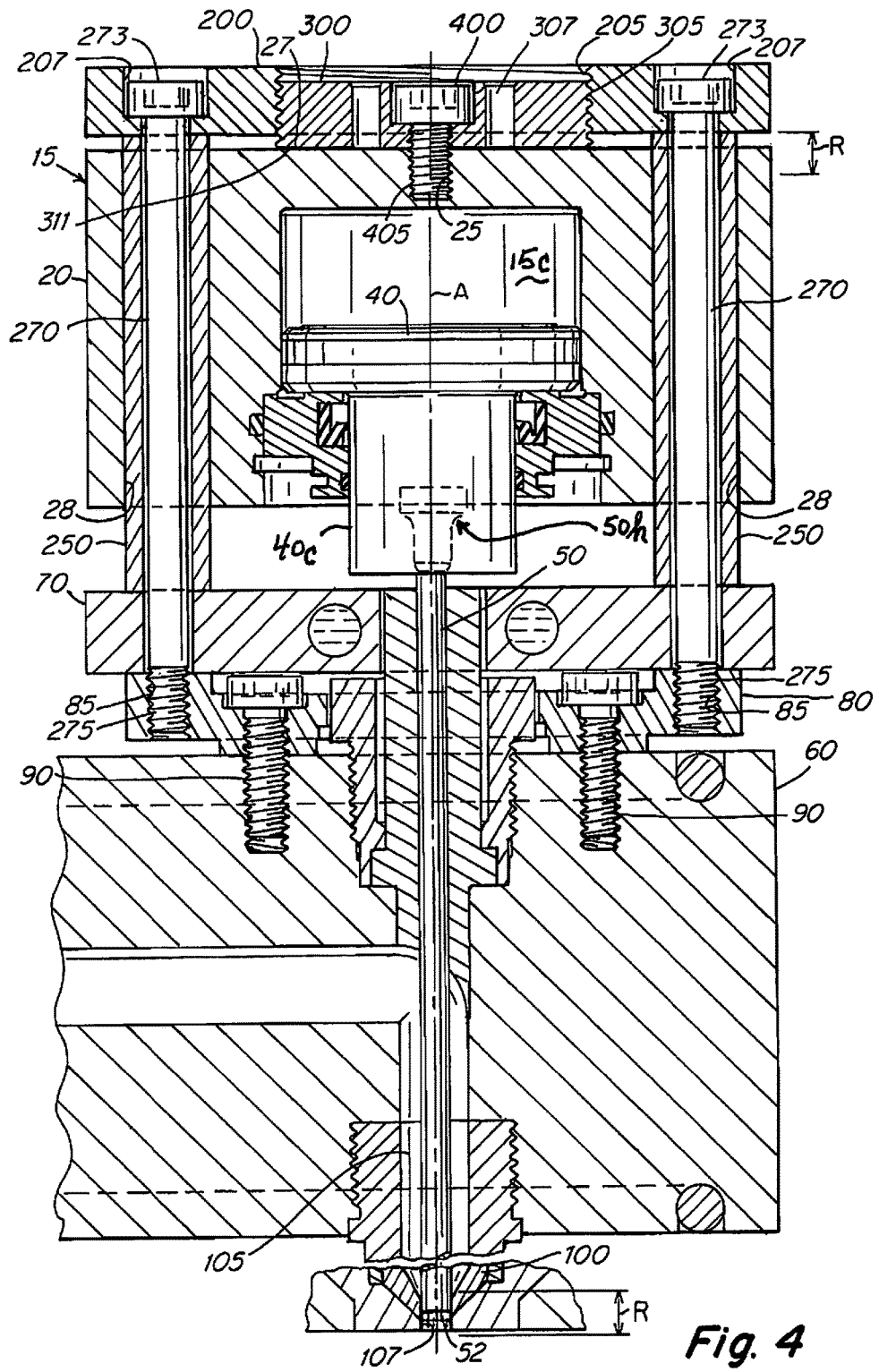
FIG. 4 is a cross-sectional view of the adjustment screw and plate components of the FIG. 1 system showing the fixed interconnection of the mounting plate to the manifold and the slidable mounting of the actuator housing on the rails.

As shown in FIGS. 1, 4 the mounting plate 200 is axially A fixedly interconnected to a downstream mount 80 via bolts 270 that are axially fixedly attached between mounting plate 200 and downstream mount 80. As shown, a cooling plate 70 is typically fixedly mounted between the actuator housing 20 and the heated manifold 60 and is supported on an upstream surface of the mount 80 that is directly attached to and in engagement with the heated manifold 60. Bolts 270 fixedly interconnect mounting plate 200 to heated manifold 60 such that the plate 200 is axially fixed relative to the exit or gate 107. Bolts 270 attach plate 200 to mount 80 via head 273 and screw 275. The head 273 of bolts 270 are received within complementary receiving attachment recesses 207 and the threaded ends 275 of bolts 270 are received within threaded apertures 85 provided mount 80. The downstream mounting plate 80 is in turn axially fixedly mounted via bolts or pins 90 to the body of fluid distribution manifold 60. The manifold 60 is in turn axially fixedly or stationarily mounted onto nozzle 62, 100 that is axially stationarily mounted at its downstream distal end within a mold plates 112. Thus the mounting plate 200 is axially stationarily mounted relative to the exit port 107 of the nozzle 100, the adjustment screw 300 being selectively adjustable in the axial direction A relative to the exit port 107.

As shown in FIGS. 1-4, 6A-7, the actuator housing 20 is axially A slidably mounted on rails 250 that are slidably received within complementary receiving apertures 28 provided within the body of housing 20. The actuator housing 20 is slidably movable upstream and downstream A along rails 250 in the axial A direction. As shown in FIG. 4, rails 250 are coaxially mounted around elongated connecting bolts or screws 270.

As shown in FIGS. 1-3, 5-7, the actuator housing 20 is reversibly and readily fixedly connectable to and disconnectable from the adjustment screw 300 via an attachment screw 400 that has male threads 405 that are screwable within female threads 25 provided within the body of housing 20. When attachment screw 400 is screwed clockwise, housing 20 is pulled upstream U, FIG. 5, to a position where the upstream top surface 27 of housing 20 eventually reaches a position where it is in compressed engagement with the downstream surface 311 of adjustment screw 300 thus fixedly connecting housing 20 axially to adjustment screw 300. When housing 20 is so connected to screw 300, the screw 300 cannot be rotated because housing 20 is rotationally fixed by virtue of its mounting on rails 250.

Once screw 300 is axially set by selective screwing 315, 317 using spanner wrench S, and housing 20 is next subsequently axially fixedly interconnected to screw 300 via screw 400 or other means, the starting and/or ending axial position of the tip end 107 of valve pin 50 is fixed for future injection cycles. The starting or ending axial injection cycle position of all of housing 20, drive member 40, valve pin 50 and the tip end 107 of the valve pin 50 are all so fixed.

Housing 20 can be disconnected from screw 300 by conversely unscrewing attachment screw 400 in a counterclockwise direction thus loosening housing 20 from compressed engagement with adjustment screw 400 and screw 300. When housing 20 is so loosened, screw 300 can be rotated or screwed via spanner screw S has teeth T that are insertable into complementary receiving apertures disposed in the upstream surface of screw 300 enabling screw 300 to be manually rotated to a selectable degree of clockwise rotation 315, FIG. 6A, 6B or to a selected degree of counterclockwise rotation 317, FIGS. 6A, 6C. When screw 300 is rotated to a selected degree 315 or 317, screw 300 is in turn moved axially 300A by a corresponding selected degree of axial travel.

Depending on the selected degree 300A of clockwise 315 or counterclockwise 317 rotation of screw 300, FIGS. 6A, 6B, 6C, 7, the axial position of screw 300 can be adjusted a selected axial distance in a downstream D or upstream U direction. Because the valve pin 50 is fixedly interconnected to the drive mechanism 40 which is, in turn, axially fixed within housing 20 during the initial pin positioning process (the housing 20 is, in turn, axially fixed to screw 300 by use of attachment screw 400, the tip end 52 of the valve pin 50 can thus be axially adjusted to a selected axial position relative to the exit port 107, the exit 107 being stationary relative to the mounting plate 200 in which adjustment screw 300 is mounted.

FIGS. 1-4 show an embodiment where the mounting plate 200 is fixedly or stationarily mounted to the manifold 60 which is in turn fixedly or stationarily mounted axially relative to the nozzle 100 and exit 107. Axial adjustment of adjustment screw 300 in upstream direction U, FIG. 6C, or adjustment of screw 300 in a downstream direction D, FIG. 6B, therefore results in a concomitant axial movement of the actuator housing 20, piston 40 and its interconnected valve pin 50 and its tip end 52 relative to exit 107 such that the tip end 52 can be positioned at selected axial positions within exit 107 at the beginning or end of an injection cycle.

The beginning or ending axial position of the valve pin 50 and its tip end 107 are typically stationary positions, the purpose of the assembly 200, 250, 300 being to enable the user to select and predetermine the precise axial location of the beginning or end axial positions as well as to change and adjust such beginning and end positions prior to beginning an injection cycle. Thus the user can predetermine before the injection cycle is started where the beginning stationary start position and the ending stationary end position of the tip end 107 is going to be.

Such selective axial positioning of the tip end 52 at the beginning of an injection cycle thus enables the user to adjust, modify, improve or change the size, shape or appearance of vestiges that may appear in or on the surface of a cooled molded part that may be formed within cavity 110 at or around the location of the exit 107 as a result of the precise positioning of the tip end 52 relative to the exit 107 when the pin 100 is in its fully downstream exit closed position. And such selective axial positioning of the tip end 52 enables the user to readily adapt the valve pin to axially fit varying axial lengths of nozzles, manifolds, actuators and other components of the system of varying sizes and configurations.

Figure 5:
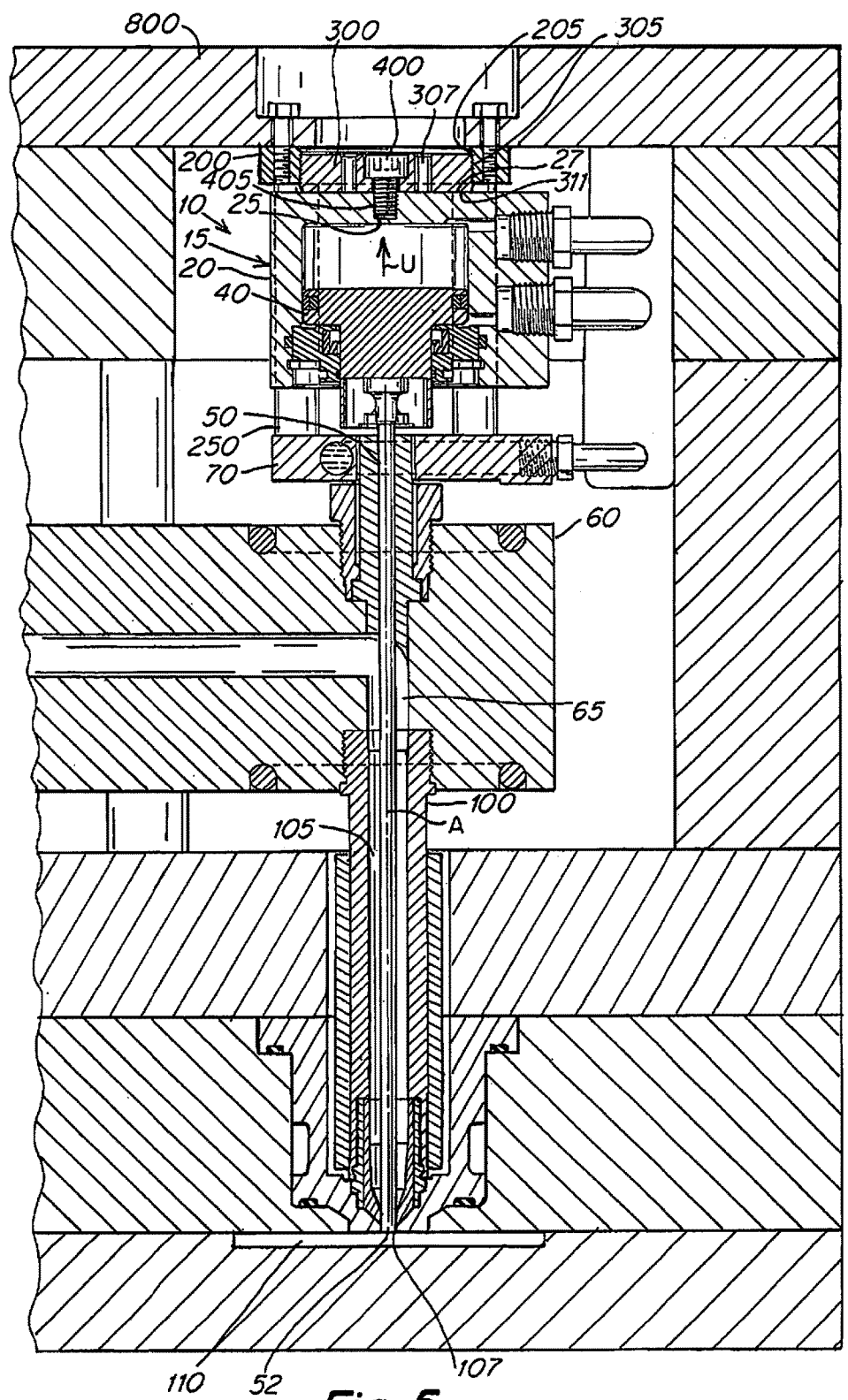
FIG. 5 is a cross-sectional view of certain components of the FIG. 1 assembly showing the adjustment screw fixedly attached to the actuator housing after adjustment of the screw within the mounting plate and showing in schematic an alternative mounting of the mounting plate to a top clamping plate.

FIG. 5 shows an alternative embodiment where the mounting plate 200 is fixedly or stationarily mounted 805 on or to a top clamping plate 800 that is disposed upstream of the manifold 60. In such an embodiment, the coupling 40c preferably is adapted to allow the pin head 50h to travel radially R within but at the same time remain axially coupled to the coupling 40c. A coupling 40c and pin head 50h design as shown and described in U.S. Pat. No. 8,091,202 (the disclosure of which is incorporated herein by reference in its entirety), particularly with reference to FIGS. 2a, 2b, 3a, 3b therein can provide a radial travel clearance for the FIG. 5 embodiment that enables the pin 50, 50h to travel radially R a small distance within the coupling 40c that occurs on heating of the manifold 60. Such radial clearance is needed because the actuator support components 200, 250, 300 for the actuator 15, 20, 40 are radially fixed relative to the manifold which is not radially fixed but rather moves and expands slightly in the radial direction on heating. Thus on heating of the manifold 60 the pin head 50h will travel radially R a small distance together with the manifold relative to the radially fixed coupling 40c. The radial clearance provided by the coupling design described in U.S. Pat. No. 8,091,202 thus allows the pin 50h to travel radially and simultaneously remain axially coupled within coupling 40c.

Figure 6A:
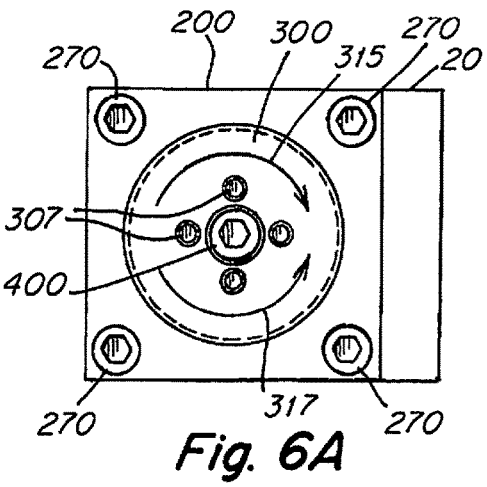
FIG. 6A is a top view of a subassembly of certain components of the FIG. 1 system showing alternatively available clockwise and counterclockwise means of screwing the adjustment screw.
Figures 6B, 6C:
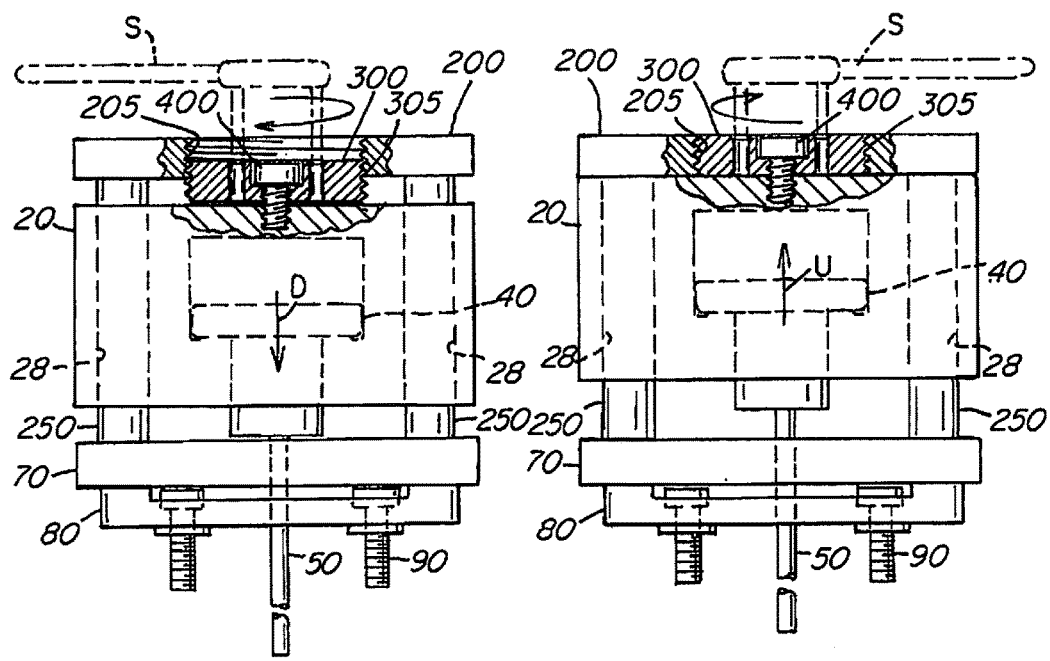
FIG. 6B is a side view of the components of the subassembly shown in FIG. 6A showing the result of clockwise rotation of the adjustment screw.
FIG. 6C is a side view of the components of the subassembly shown in FIG. 6A showing the result of counterclockwise rotation of the adjustment screw.
Figure 7:
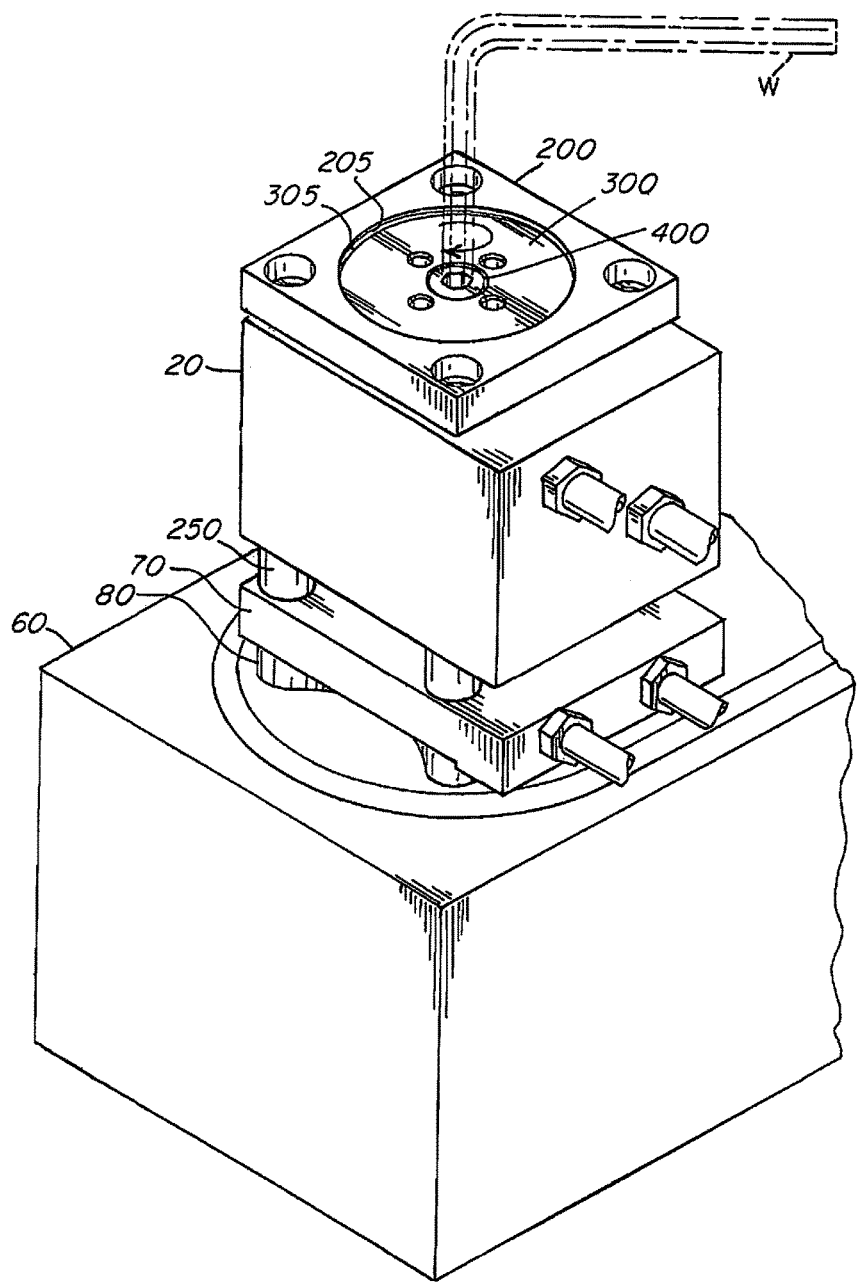
FIG. 7 is a perspective view of the subassembly of components of FIG. 6 showing a final step in use of the mounting plate-adjustment screw where the adjustment screw is fixedly attached to the actuator housing causing the housing to axially slide on the rails to a fixed position determined by the previous step of rotating the adjustment screw within the mounting plate.

In such an embodiment the top clamping plate 800 is, in turn, stationarily mounted axially relative to the nozzle 100 and the nozzle exit or exit port 107, such that axial adjustment of adjustment screw 300 in upstream direction U, FIG. 6C, or adjustment of screw 300 in a downstream direction D, FIG. 6B, results in a concomitant axial movement of the actuator housing 20, piston 40 and its interconnected valve pin 50 and its tip end 52 relative to axially stationary mounting plate 200. Again, such selective axial positioning of the tip end 52 at the beginning of an injection cycle enables the user to adjust, modify, improve or change the size, shape or appearance of vestiges that may appear in or on the surface of a cooled molded part that may be formed within cavity 110 at or around the location of the exit 107. And such selective axial positioning of the tip end 52 enables the user to readily adapt the valve pin to axially fit varying axial lengths of nozzles, manifolds, actuators and other components of the system of varying sizes and configurations.

What is claimed is:

1. An injection molding apparatus comprising a top clamp plate mounted to a mold, a heated manifold mounted between the top clamp plate and the mold, the heated manifold receiving and distributing an injection fluid to an exit of a fluid delivery channel to a cavity of the mold, an actuator comprising a housing having a chamber enclosing a drive member that is fixedly interconnectable to a valve pin, the drive member driving the valve pin reciprocally upstream and downstream through the fluid delivery channel to reciprocally open and close the exit, the actuator housing being slidably mounted upstream of the fluid delivery channel for controlled upstream and downstream axial movement of the actuator housing and the drive member along a path complementary to the axial path of travel of the valve pin, a mounting plate and an axial position adjustment screw screwably mounted within the mounting plate upstream of the housing of the actuator, the adjustment screw being controllably screwable clockwise and counterclockwise within the mounting plate to move along an upstream and downstream path complementary to the axial path of travel of the drive member and the valve pin, the valve pin being movable to selectable starting or ending injection cycle axial positions upon interconnection of the valve pin to the drive member, clockwise or counterclockwise screwing of the adjustment screw within the mounting plate to corresponding selectable axial positions and subsequent interconnection of the adjustment screw to the actuator, and wherein the actuator housing is mounted for axial movement without rotation.

2. The apparatus of claim 1 wherein the drive member is interconnectable to and disconnectable from the valve pin externally of the enclosure of the housing of the actuator while the enclosure is enclosed.

3. The apparatus of claim 2 further comprising a coupling that interconnects an upstream end of the valve pin to the axial drive device, the coupling being accessible for interconnection and disconnection of the valve pin while the enclosure is enclosed.

4. The apparatus of claim 1 wherein the actuator comprises a fluid driven actuator, the enclosure of the actuator comprising a fluid sealed chamber, the axial drive device comprising a piston slidably mounted within the fluid sealed chamber.

5. The apparatus of claim 1 wherein the mounting plate is fixedly mounted to either a fluid delivery manifold or a top clamping plate in an arrangement such that the adjustment screw is rotatable to axially adjust the valve pin to selectable upstream and downstream axial positions.

6. The apparatus of claim 5 wherein the manifold is disposed between the mounting plate and the exit of the fluid delivery channel, the manifold having a fluid distribution channel delivering injection fluid to the fluid delivery channel.

7. The apparatus of claim 5 wherein the top clamp plate is disposed upstream of the manifold.

8. The apparatus of claim 1 wherein the actuator housing is mounted for axial movement together with the drive member.

9. The apparatus of claim 1 further comprising a top clamp plate interconnected to a mold containing a cavity with which the exit of the fluid delivery channel communicates, a heated manifold that delivers heated injection fluid to the fluid delivery channel and an injection molding machine that delivers heated injection fluid to the heated manifold.

10. A method of adjusting an axial position of a valve pin in an injection molding system comprising a top clamp plate mounted to a mold, a heated manifold mounted between the top clamp plate and the mold, the heated manifold receiving and distributing an injection fluid to an exit of a fluid delivery channel to a cavity of the mold, and an actuator comprised of a housing that forms an enclosure that contains a controllably drivable axial drive device interconnectable to and adapted to drive a valve pin reciprocally upstream and downstream along an axial path of travel through a fluid delivery channel having an exit which is reciprocally opened and closed by reciprocal upstream and downstream driven movement of a distal tip end of the valve pin into and out of the exit of the fluid delivery channel, wherein the actuator is mounted upstream of the fluid delivery channel and adapted for controlled upstream and downstream movement of the actuator and the drive member along a path complementary to the axial path of travel of the valve pin, the apparatus including a mounting plate and an axial position adjustment screw screwably mounted within the mounting plate upstream of the housing of the actuator, the adjustment screw being controllably screwable clockwise and counterclockwise within the mounting plate to move along an upstream and downstream path complementary to the axial path of travel of the drive member and the valve pin, the method comprising:

screwing the adjustment screw clockwise or counterclockwise a selected degree of rotation within the mounting plate to position the adjustment screw at a selected axial position along its axial path of movement, moving the actuator along the axial direction complementary to the axial path of travel of the valve pin, fixedly interconnecting the adjustment screw to the actuator housing to controllably move the actuator and the valve pin to a preselected axial starting or ending injection cycle position along the axial path of movement of the valve pin as predetermined by the selected degree of screwable rotation of the adjustment screw, and moving the actuator housing along its axial path of movement without rotation.

11. The method of claim 10 further comprising interconnecting and disconnecting the axial drive device to and from the valve pin externally of the actuator housing while the enclosure is enclosed and contains the axial drive device.

12. The method of claim 10 further comprising fixedly mounting the mounting plate to either a fluid delivery manifold or a top clamping plate in an arrangement such that the adjustment screw is rotatable to adjust the valve pin to move to selectable upstream and downstream axial positions.

13. The method of claim 10 further comprising disposing the manifold between the actuator and the exit of the fluid delivery channel, the manifold having a fluid distribution channel delivering injection fluid to the fluid delivery channel.

14. The method of claim 10 further comprising disposing the top clamp plate upstream of the manifold.

15. Apparatus for adjusting the axial position of a valve pin in an injection molding system, the apparatus comprising:

a top clamp plate mounted to a mold, a heated manifold mounted between the top clamp plate and the mold, the heated manifold receiving and distributing an injection fluid to an exit of a fluid delivery channel to a cavity of the mold, an actuator comprised of a housing that forms a chamber that contains a drive member interconnected to and adapted to drive a valve pin reciprocally upstream and downstream along an axial path of travel through a fluid delivery channel having an exit which is reciprocally opened and closed by reciprocal upstream and downstream driven movement of a distal tip end of the valve pin into and out of the exit of the fluid delivery channel, a mounting plate and an adjustment screw screwably mounted within the mounting plate, the mounting plate and adjustment screw being arranged such that the adjustment screw is controllably movable along an axial path complementary to the axial path of travel of the valve pin by controlled clockwise and counterclockwise screwable movement of the adjustment screw within the mounting plate, the actuator housing being slidably mounted upstream of the fluid delivery channel for controlled upstream and downstream movement of the drive member along a path complementary to the axial path of travel of the valve pin, the valve pin being movable to selectable starting or ending injection cycle axial positions upon interconnection of the valve pin to the drive member, clockwise or counterclockwise screwing of the adjustment screw within the mounting plate to corresponding selectable axial positions and subsequent interconnection of the adjustment screw to the actuator, the drive member being interconnectable to and disconnectable from the valve pin externally of the chamber of the housing of the actuator while the chamber is enclosed and contains the drive member, and wherein the actuator housing is mounted for axial movement without rotation.

16. The apparatus of claim 15 further comprising a coupling that interconnects an upstream end of the valve pin to the axial drive device, the coupling being accessible for interconnection to and disconnection from the valve pin while the chamber is enclosed and contains the drive member.

17. The apparatus of claim 15 wherein the mounting plate and adjustment screw are mounted separate and spaced upstream apart from the actuator housing.

18. The apparatus of claim 15 wherein the actuator comprises a fluid driven actuator, the enclosure of the actuator comprising a fluid sealed chamber, the axial drive device comprising a piston slidably mounted within the fluid sealed chamber.

19. The apparatus of claim 15 wherein the mounting plate is fixedly mounted to either a fluid delivery manifold or a top clamping plate in an arrangement such that the adjustment screw is rotatable to axially adjust the valve pin to selectable upstream and downstream axial positions.

20. The apparatus of claim 15 wherein the manifold is disposed between the mounting plate and the exit of the fluid delivery channel, the manifold having a fluid distribution channel delivering injection fluid to the fluid delivery channel.

21. The apparatus of claim 15 wherein the top clamp plate is disposed upstream of the manifold.

22. The apparatus of claim 15 further comprising a top clamp plate interconnected to a mold having a cavity with which the exit of the fluid delivery channel communicates, a heated manifold that delivers heated injection fluid to the fluid delivery channel and an injection molding machine that delivers heated injection fluid to the heated manifold.

23. Apparatus for adjusting the axial position of a valve pin in an injection molding system, the apparatus comprising:

a top clamp plate mounted to a mold, a heated manifold mounted between the top clamp plate and the mold, the heated manifold receiving and distributing an injection fluid to an exit of a fluid delivery channel to a cavity of the mold, an actuator comprised of a housing that forms and encloses a chamber that contains a controllably drivable axial drive device interconnected to and adapted to drive a valve pin reciprocally upstream and downstream along an axial path of travel through a fluid delivery channel having an exit which is reciprocally opened and closed by reciprocal upstream and downstream driven movement of a distal tip end of the valve pin into and out of the exit of the fluid delivery channel, a mounting plate and adjustment screw mounted upstream, spaced apart and separate from the actuator housing, the mounting plate being mounted in an axially stationary position relative to the exit of the fluid delivery channel, the adjustment screw being screwably mounted within the mounting plate such that the adjustment screw is controllably movable along a path complementary to the axial path of travel of the valve pin by controlled clockwise and counterclockwise screwable movement of the adjustment screw within the mounting plate, the actuator housing being mounted for upstream and downstream axial movement of the axial drive device along a path complementary to the axial path of travel of the valve pin, the adjustment screw being readily fixedly interconnectable to and detachable from the actuator housing such that the axial drive device and valve pin are controllably movable together upstream and downstream to selectable axial positions when the adjustment screw and actuator housing are fixedly interconnected to each other, the distal tip end of the valve pin being controllably positionable at selectable axial positions relative to the exit by controlled clockwise and counterclockwise screwing of the adjustment screw within the mounting plate when the adjustment screw is fixedly interconnected to the actuator housing, and wherein the actuator housing is mounted for axial movement without rotation.

24. The apparatus of claim 23 wherein the axial drive device is interconnectable to and disconnectable from the valve pin externally of the chamber while the chamber is enclosed and contains the axial drive device.

25. The apparatus of claim 24 further comprising a coupling that interconnects an upstream end of the valve pin to the axial drive device, the coupling being accessible for interconnection and disconnection of the valve pin while the enclosure is enclosed.

26. The apparatus of claim 23 wherein the actuator comprises a fluid driven actuator, the chamber of the actuator comprising a fluid sealed chamber, the axial drive device comprising a piston slidably mounted within the fluid sealed chamber.

27. The apparatus of claim 23 wherein the mounting plate is fixedly mounted to either a fluid delivery manifold or a top clamping plate in an arrangement such that the adjustment screw is rotatable to axially adjust the valve pin to selectable upstream and downstream axial positions.

28. The apparatus of claim 27 wherein the manifold is disposed between the mounting plate and the exit of the fluid delivery channel, the manifold having a fluid distribution channel delivering injection fluid to the fluid delivery channel.

29. The apparatus of claim 27 wherein the top clamp plate is disposed upstream of the manifold.

30. The apparatus of claim 23 further comprising a top clamp plate interconnected to a mold containing a cavity with which the exit of the fluid delivery channel communicates, a heated manifold that delivers heated injection fluid to the fluid delivery channel and an injection molding machine that delivers heated injection fluid to the heated manifold.

31. A method of performing an injection molding cycle comprising forming a part in a mold of an apparatus according to claim 23.

\* \* \* \* \*